United States Patent [19]

Onagawa

[11] Patent Number: 5,635,960
[45] Date of Patent: *Jun. 3, 1997

[54] HORIZONTAL POSITION COMPENSATION CIRCUIT

[75] Inventor: Seiki Onagawa, Tokyo, Japan

[73] Assignee: NEC Corporation, Tokyo, Japan

[*] Notice: The term of this patent shall not extend beyond the expiration date of Pat. No. 5,548,307.

[21] Appl. No.: 615,165

[22] Filed: Mar. 12, 1996

Related U.S. Application Data

[63] Continuation of Ser. No. 358,365, Dec. 19, 1994, Pat. No. 5,548,307.

[30] Foreign Application Priority Data

Dec. 28, 1993 [JP] Japan .................................... 5-336195

[51] Int. Cl.⁶ .............................. G09G 5/00; H04N 17/00
[52] U.S. Cl. ........................... 345/213; 348/177; 348/179
[58] Field of Search ................................ 345/213, 113, 345/115; 348/177, 178, 179, 563, 564, 565

[56] References Cited

U.S. PATENT DOCUMENTS

| | | | |
|---|---|---|---|
| 4,802,007 | 1/1989 | Van der Brug | 348/179 |
| 5,020,116 | 5/1991 | Macaulay | 348/177 |
| 5,144,418 | 9/1992 | Brown et al. | 348/177 |
| 5,548,307 | 8/1996 | Onagawa | 345/213 |

FOREIGN PATENT DOCUMENTS 165195 6/1990 Japan .

*Primary Examiner*—Mark R. Powell
*Assistant Examiner*—Matthew Luu
*Attorney, Agent, or Firm*—Sughrue, Mion, Zinn, Macpeak & Seas

[57] ABSTRACT

When a first video signal produced by computer graphics is displayed on a raster scan display together with another video signal which is not produced by computer graphics, horizontal position of the first video signal is automatically compensated, by comparing check points in a first test pattern produced by computer graphics and in a second test pattern which is not produced by computer graphics.

14 Claims, 7 Drawing Sheets

HORIZONTAL POSITION COMPENSATION CIRCUIT

This application is a continuation of application Ser. No. 08/358,365, filed Dec. 19, 1994, now U.S. Pat. No. 5,548,307.

BACKGROUND OF THE INVENTION

This invention relates to a horizontal position compensation circuit for compensating horizontal position of a picture on a display. When a first video signal which is produced by computer graphics in a host computer and a second video signal which is not produced by computer graphics in the host computer are simultaneously displayed on a raster scanned display, it is necessary to compensate horizontal position of the first video signal on the display, because a video signal produced by computer graphics has different intervals between a horizontal synchronizing pulse and a start point of the video signal for different host computers. Therefore, when an area of a picture of the first video signal is deleted and there a part of a picture of the second video signal is inserted, a gap may be formed between the two pictures when the horizontal position of the first video signal is not compensated.

Heretofore, the horizontal position compensation of the first video signal is performed by an operator through an interactive input unit controlled by a program called a tuning soft. A prior art of the horizontal position compensation is described in connection with FIG. 6 and FIG. 7.

In an example shown in FIG. 6, the host computer is a personal computer(abbreviated to PC), and a first video signal produced by computer graphics in PC proper 1 is denoted by PC-RGB. A second video signal which is not produced by computer graphics in the PC proper 1 is denoted by "VIDEO SIGNAL". A first frame buffer 4 is to store temporally the first video signal and a second frame buffer 2 is to store temporally the second video signal. A read address counter 3 generates address signal for reading both frame buffers 2 and 4. This address signal is used also for writing the second frame buffer 2. A write address counter 5 generates address signal for writing the first frame buffer 4.

The read address counter 3 and the write address counter 5 are controlled by clock signals from the PC proper 1. The clock signals include dot clocks, horizontal synchronizing pulses, and vertical synchronizing pulses, and are denoted by 'CLOCK' in the drawing. These clocks are delayed by a horizontal position compensator 65 and are delivered to the write address counter 5. Thus, the first video signal is stored in the first frame buffer 4 at an address reduced by the delay.

The amount of delay is stored in an EEPROM 64, and at an initialization, the contents of the EEPROM 64 are transferred to a compensation register 63. The contents of the compensation register 63 is changed by an up/down signal delivered by an operator through an interactive input unit (not shown in the drawing).

In an operation mode of the circuit of FIG. 6, the first video signal stored in the first frame buffer 4, and the second video signal stored in the second frame buffer 2 are read out accessed by the output of the read address counter 3. Either one of the two signals read out from the two frame buffers 2 and 4 is selected by a data selector 7 and converted to an analog signal by DAC (a digital analog converter) 10 to be displayed on a display 11. The sweep of the display 11 is controlled by the PC proper 1. And the PC proper 1 controls through the data selector 7 an area of the screen of the display 11 wherein the first video signal is substituted by the second video signal.

The first video signal and the second video signal are digital signals, for example, a pixel in the picture is represented by three color intensity values R, G, B, each component being represented by 8 bits of a binary digits. For memory volume economy, there are cases when the three color intensity values R, G, B are converted to Y(8 bits), Cr(4 bits), Cb(4 bits) and are stored in the frame buffers 2 and 4. In these cases a matrix circuit must be inserted between the DAC 10 and the display 11 for converting to three color intensity values R, G, B.

In a compensation mode, a tuning soft 62 in the PC proper 1 executes a program shown in FIG. 7. At an initialization step 101, the contents of the EEPROM 64 are loaded to the compensation register 63. At a step 102, a predetermined dot pattern(hereafter called a second dot pattern) is loaded in the second frame buffer 2 in a predetermined range of address. At a step 103, a first dot pattern is produced by computer graphics in the predetermined range of address, and is loaded in the first frame buffer 4. In a step 104, the two frame buffers 2 and 4 are read out by the read address counter 3. The read out signals are alternately displayed as shown by a step 105 and a step 106. The operator observes the display, and when the first dot pattern picture and the second dot pattern picture do not coincide on the screen of the display 11, he delivers the up/down signal through the interactive input unit to displace the first dot pattern picture horizontally to a place coincident with the second dot pattern picture. And from a command delivered by the operator through the interactive input unit, the contents of the compensation register 63 is stored in the EEPROM 64. In a next operation mode, there is a high probability in which no compensation is necessary, since an adaptive compensation data is stored in the EEPROM 64.

In a prior art method of horizontal position compensation, the step 107 and 108 must be performed by an operator, and this is a troublesome burden on the operator.

SUMMARY OF THE INVENTION

Therefore, a primary object of the present invention is to provide a horizontal position compensation circuit wherein the horizontal position of a picture generated by computer graphics and displayed on a raster scan display, is automatically compensated.

In order to achieve this object, an automatic tuning soft in a PC proper of this invention executes following three program steps. In the first step, a horizontal line having a first dot pattern is generated by computer graphics in the PC proper, and this horizontal line of the first dot pattern is stored in all the lines of a first frame buffer. Lines of a second dot pattern are written in a second frame buffer. In the first dot pattern and in the second dot pattern, there is at least one check point where dot changes (intensity or color), and these check points in both patterns are positioned at a same distance from the start of the lines. In the second step, the first and the second frame buffer are read out, a check point in the first frame buffer and a corresponding check point in the second frame buffer are detected. The position difference between the detected two frame buffers is an error signal for horizontal position compensation. In the third step, an automatic horizontal position compensator adjusts the delay of the clock to the write address counter by an amount to bring the error signal to naught.

BRIEF DESCRIPTION OF THE DRAWINGS

Further objects, features, and advantages of this invention will become apparent from a consideration of the following description, the appended claims, and the accompanying drawings in which the same numerals indicate the same or the corresponding parts.

DETAILED DESCRIPTION OF THE PREFERRED EMBODIMENTS

Figure 1:
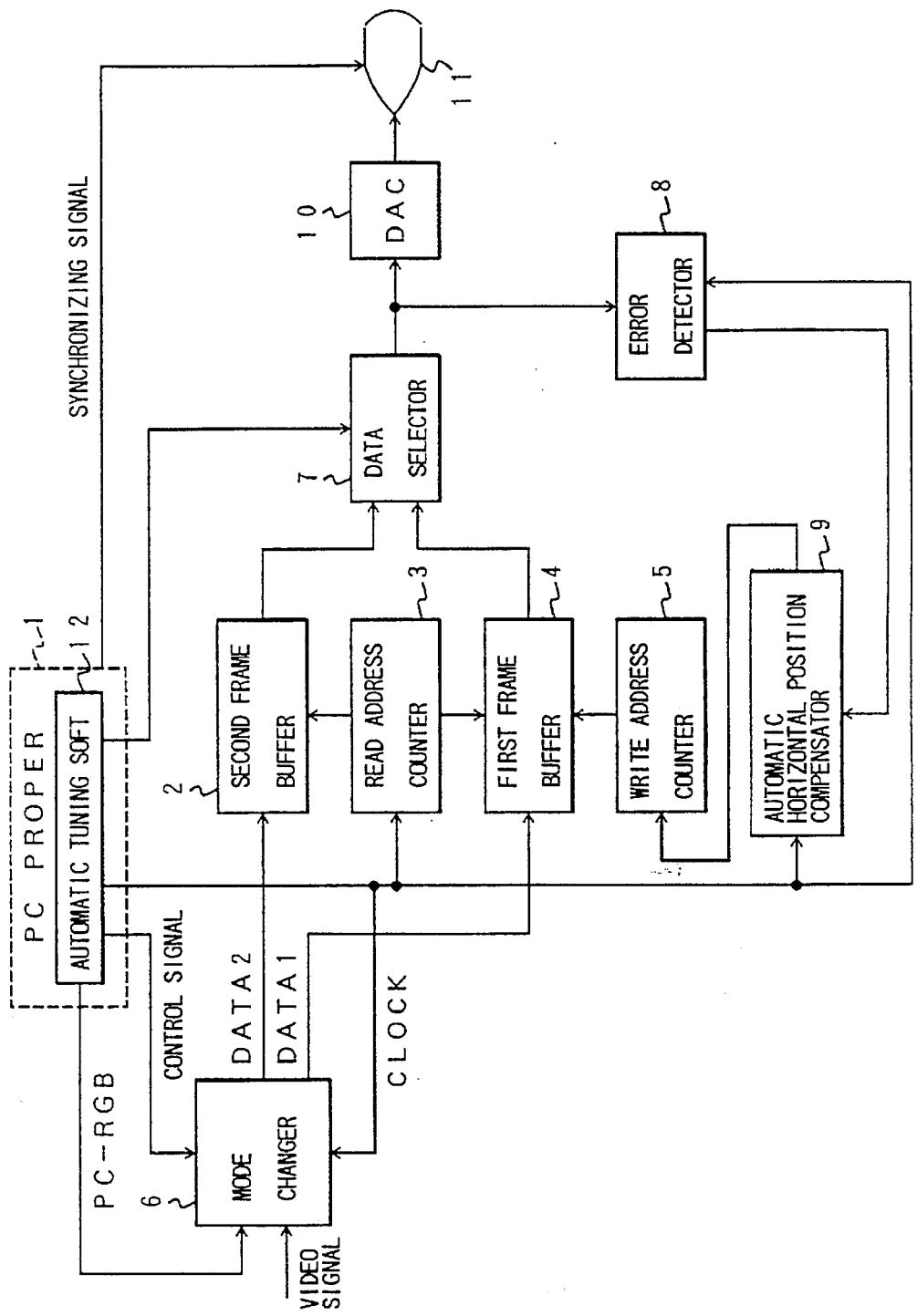
FIG. 1 shows a block diagram of an embodiment of this invention.
Figure 6:
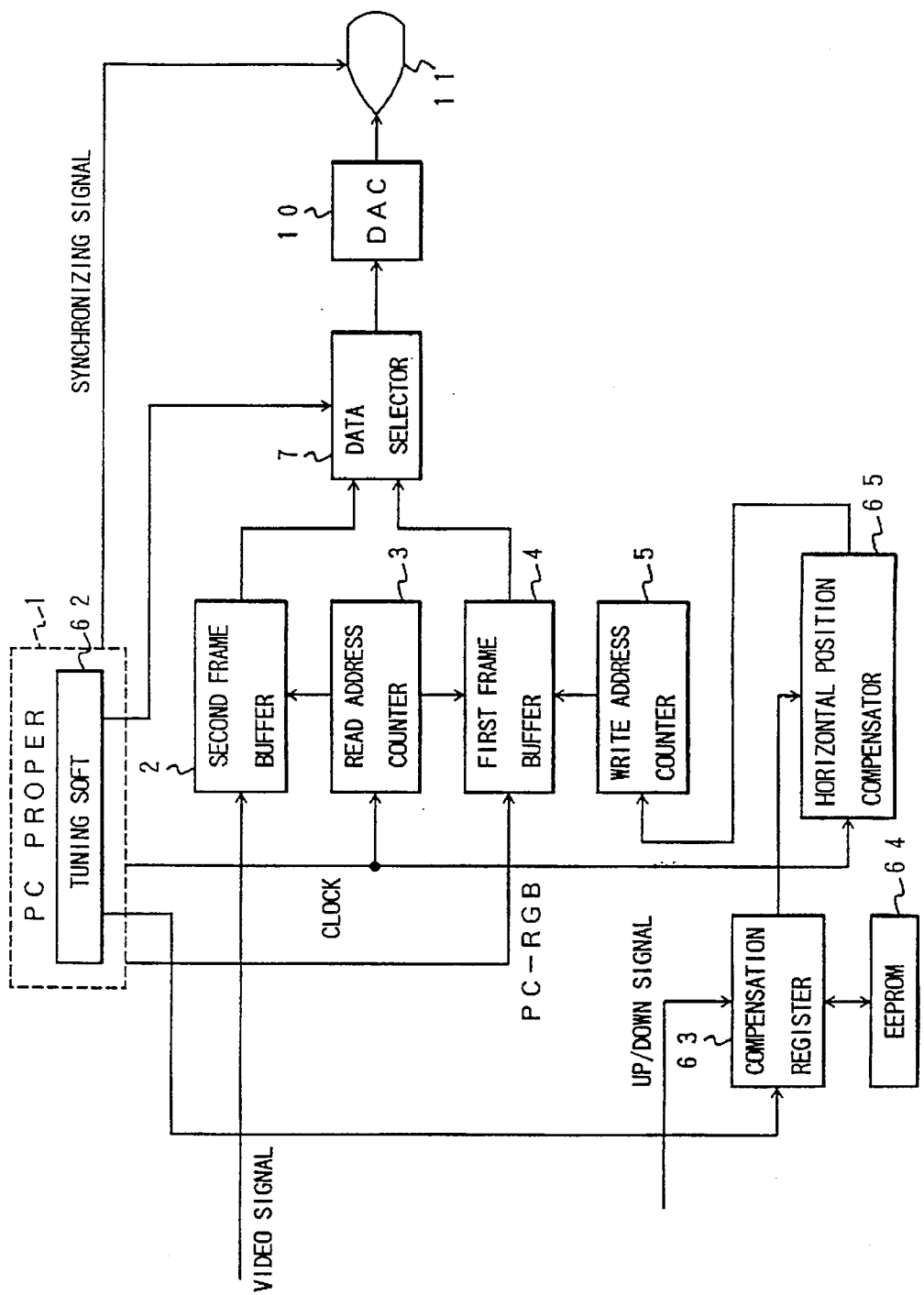
FIG. 6 shows a block diagram of a prior art.
Figure 7:
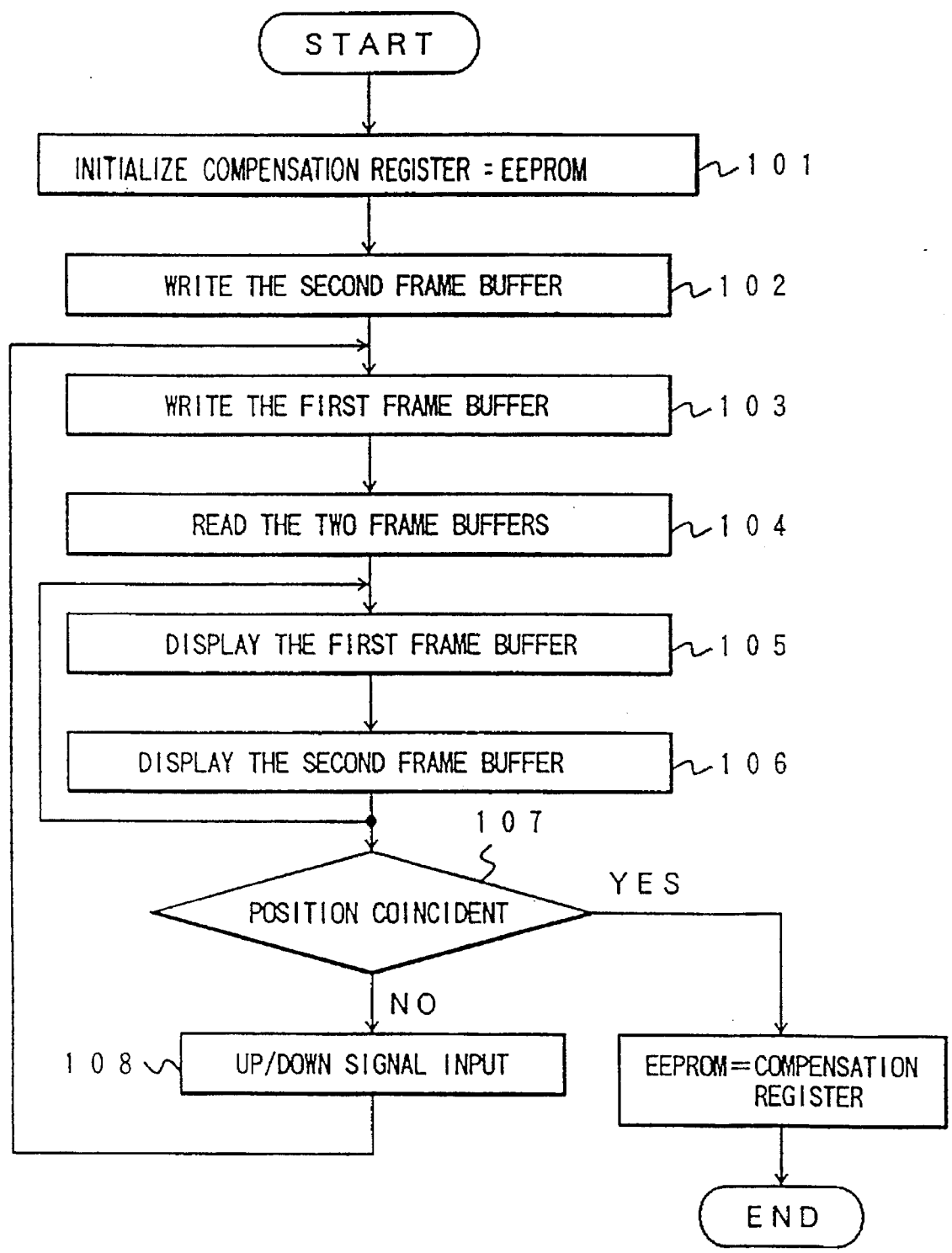
FIG. 7 shows a flow chart illustrating program steps executed in a prior art of FIG. 6.

Referring to FIG. 1, the second frame buffer 2, the read address counter 3, the first frame buffer 4, the write address counter 5, the data selector 7, the DAC 10, and the display 11 are respectively the same with the parts of the same numerals in FIG. 6.

The circuit shown in FIG. 1 has two modes selected by OS(operations system)(not shown in the drawing)in the PC proper 1. In an operation mode, the circuit of FIG. 1 works just in a same way with the circuit of FIG. 6, and need not to be described here.

In a compensation mode, a mode changer 8 changes input signals to the first frame buffer 4 and the second frame buffer 2. An error detector 8 detects horizontal position error between the output from the first frame buffer 4 and that from the second frame buffer 2. An automatic horizontal position compensator D compensates the delay of the clock input to the write address counter 8.

Figure 2:
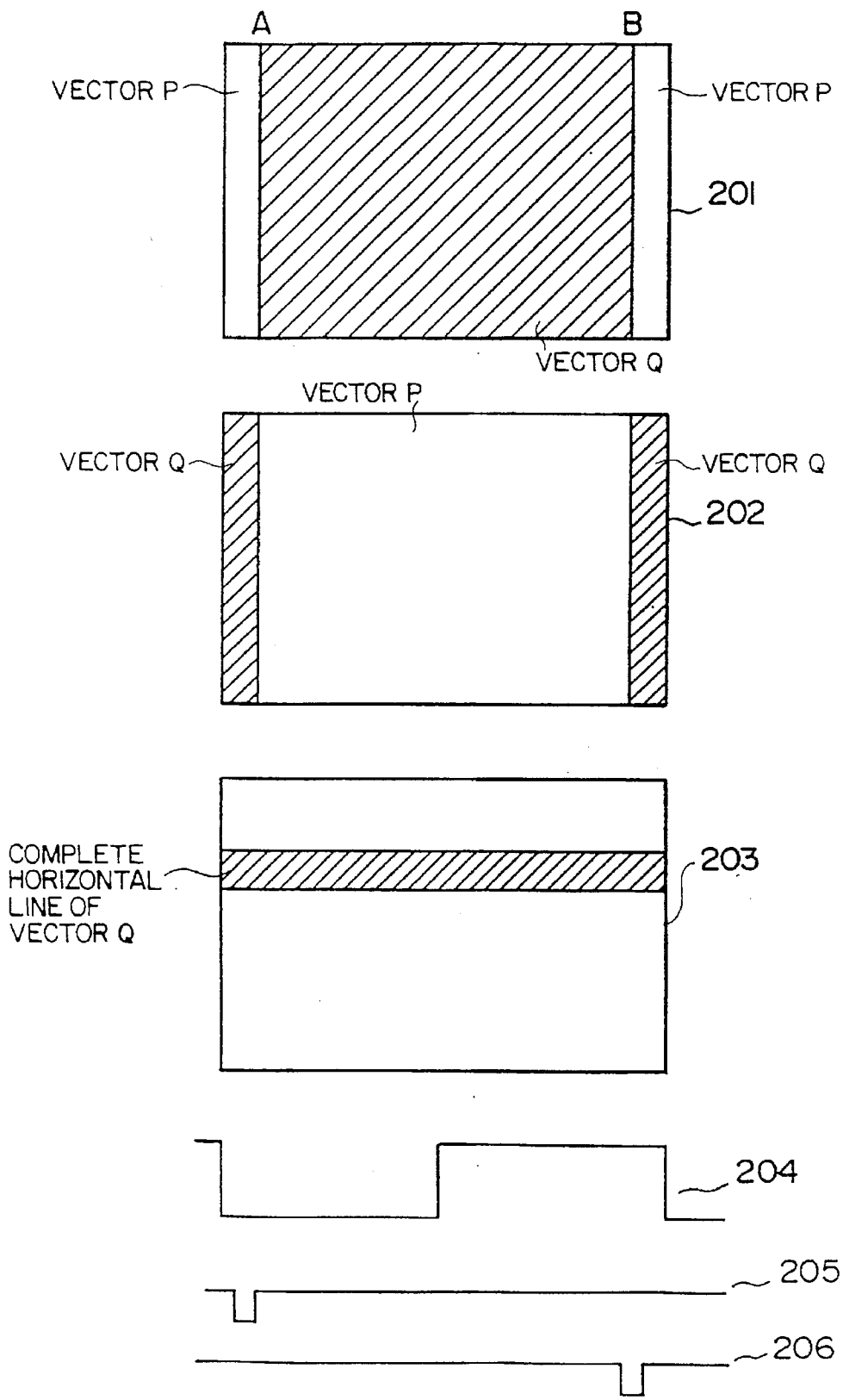
FIG. 2 shows an example of test patterns used in an embodiment of this invention.

Referring to FIG. 2, there are shown two test patterns 201 and 202. In each test pattern, horizontal lines have a same dot pattern. In the pattern 201, from the start point of the line to the point A, all the dots can be represented by a vector P(blank area in the drawing), the three components of the vector P representing three color intensity values R, G, B of the dot(pixel). From the point A to the point B, all the dots can be represented by vector Q(shaded area in the drawing), the three components of the vector representing three color intensity values R, G, B of the dot(pixel). From the point B to the end of the line, all the dots can be represented by the vector P.

The test pattern 202 is a complementary pattern to the pattern 201, where all the dots from the start point of the line to the point A and all the dots from the point B to the end of the line can be represented by the vector Q, while all the dots from the point A to the point B can be represented by a vector P.

In a compensation mode, the test pattern 202 is generated by computer graphics in the PC proper 1 and is loaded in the first frame buffer 4. The test pattern 201 is generated in the mode changer 6 and is written in the second frame buffer 2.

Figure 3:
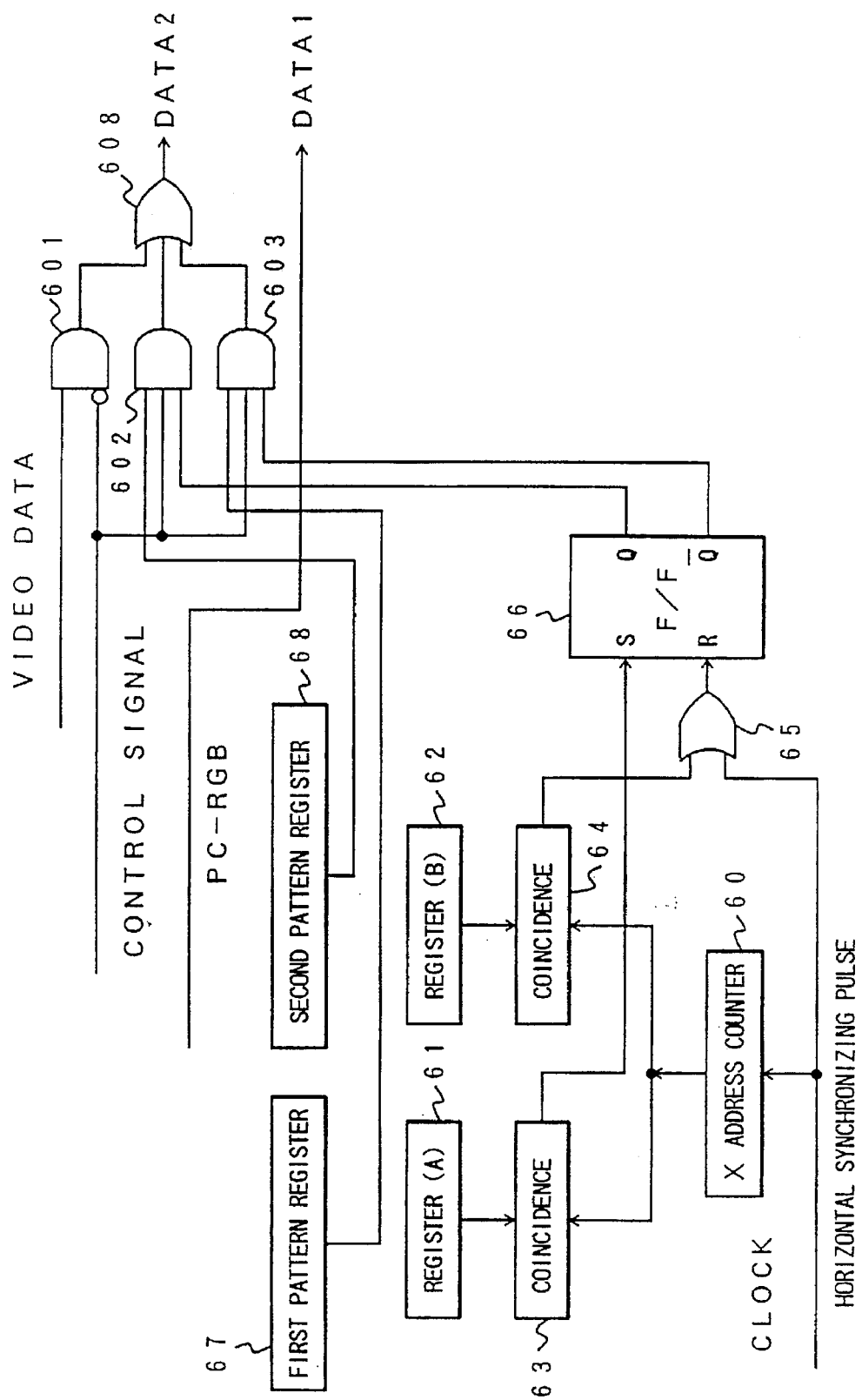
FIG. 3 shows a block diagram of a mode changer in FIG. 1.

Now referring to FIG. 3, an X address counter 60 is reset by a horizontal synchronizing pulse and counts the clock pulse. A register(A) 61 stores value of A, and when a coincidence circuit 68 detects coincidence between the count of the counter 60 and the contents of the register 61, a pulse is generated to set a flipflop 66. A register(B) 62 stores value of B, and when a coincidence circuit 64 detects coincidence between the count of the counter 60 and the contents of the register 62, a pulse is generated to reset the flipflop 66. The flipflop 66 is also reset by the horizontal synchronizing pulse.

A control signal is turned on to logic "H" in a compensation mode, and the extraneous video data is cut off at an AND gate 601. A first pattern register 67 stores the vector P and the second pattern register 68 stores the vector 0. In the compensation mode, the vector P is delivered as the DATA 2 during the time when the flipflop 66 is off, and the vector 0 is delivered as the DATA 2 during the time when the flipflop 66 is on. Thus a second frame buffer 2 is loaded with the test pattern 201.

After the first frame buffer 4 is loaded with the test pattern 202, and the second frame buffer 2 is loaded with the test pattern 201, the both frame buffers 2 and 4 are read out by the read address counter 3. The data selector 7 selects output of the first frame buffer 4 from the start to the point A and from the point B to the end of the read address counter 3, and selects output of the second frame buffer 2 from the point A to the point B of the read address counter 3. The output of the data selector 7 is delivered to the error detector 8.

Figure 4:
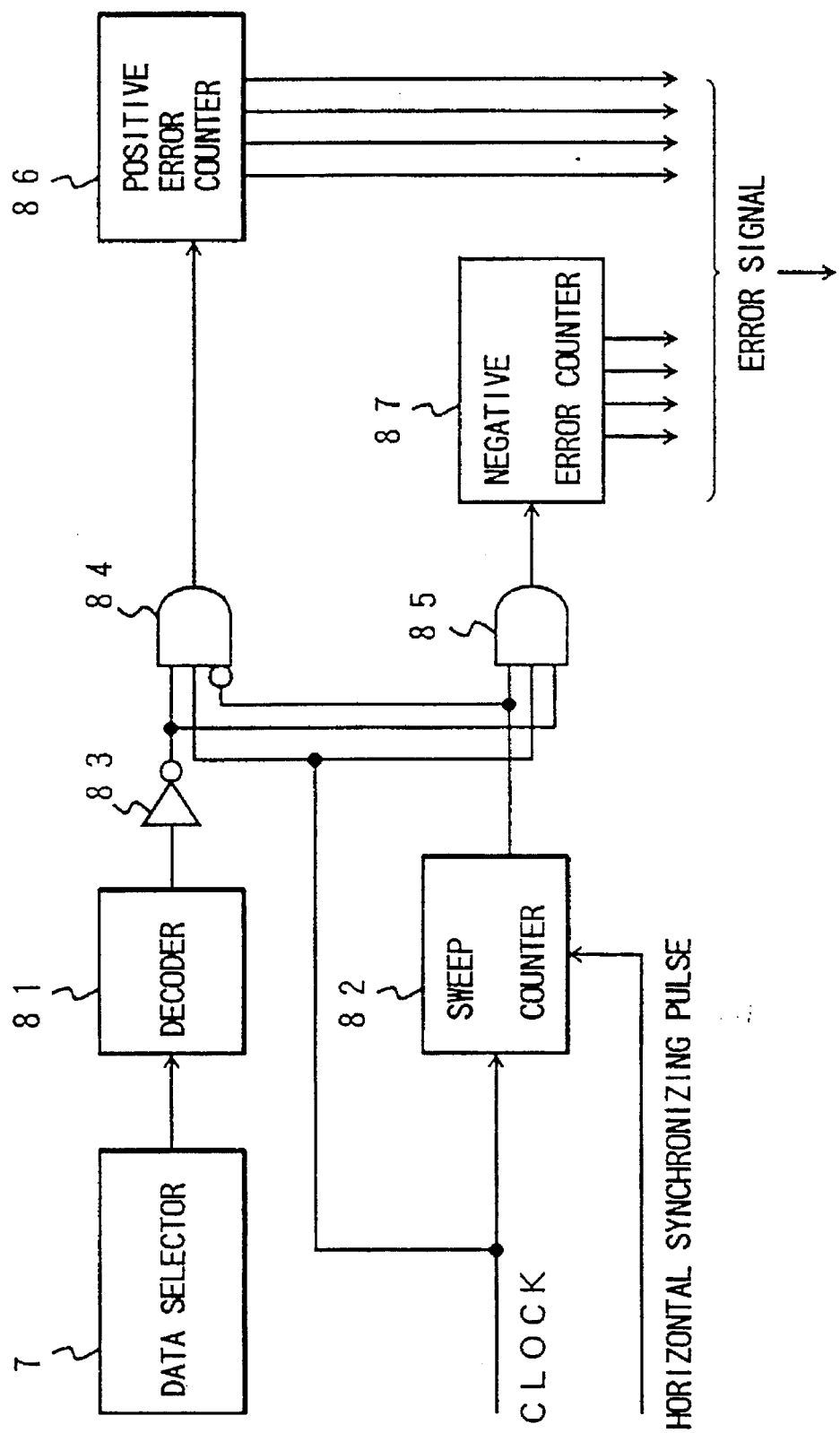
FIG. 4 shows a block diagram of an error detector in FIG. 1.

Now referring to FIG. 4, a block diagram of the error detector 8 is illustrated. The output of the data selector 7 is decoded in a decoder 81, wherein logic "H" signal is generated for a bit pattern corresponding the vector Q and logic "L" signal is generated for other bit patterns. When the horizontal position of the two test patterns 201 and 202 are aligned, the output of the data selector 7 is Q for all the dots of a horizontal line as shown by 203 of FIG. 2. When the two test patterns 201 and 202 are not aligned, a gap is produced after the point A or after the point B, where dots do not represent the vector Q and the output of the decoder 81 is logic "L" as shown by a waveform 205 or 206 in FIG. 2.

A sweep counter 82 is reset by a horizontal synchronizing pulse and counts the clock pulse. The output logic of the last stage flipflop of the counter 82 is "L" in a first half of a sweep and is "H" in a last half of the sweep as shown by 204 in FIG. 2. Thus, the clock pulses pass an AND gate 84 during the gap in the first half of the sweep and pass an AND gate 85 during the gap in the last half of the sweep. Clock pulses from the AND gate 84 are counted in a positive error counter 86, and clock pulses from the AND gate 85 are counted in a negative error counter 87. Thus, the output of the counters 86 and 87 indicate the direction and the magnitude of error in the horizontal position compensation. The output of the error detector 8 is delivered to the automatic horizontal position compensator 9.

Now, the automatic horizontal position compensator 9 is explained in connection with FIG. 5. A delay circuit 91 gives different delays with a unit increment of one clock cycle to the clock pulse. One of these delayed pulses is selected at a selector 92 by the error signal. Since the error signal from the error detector 8 is expressed by a unit which is also one clock cycle, the error can be compensated by displacing an input selection switch (not shown in the drawing) of the selector 92 by an amount corresponding to the error signal.

In a practice, the initial position of the selector 92 at an initialization may be determined at a position where delay amount is zero. In this initial position, the test pattern 202 always lags behind the test pattern 201, and the sweep counter 82 in FIG. 4 for determining the position of the gap may be eliminated.

When the detected error signal becomes zero, the compensation mode is finished, and the circuit in the mode changer 6 is connected in an operation mode.

Figure 5:
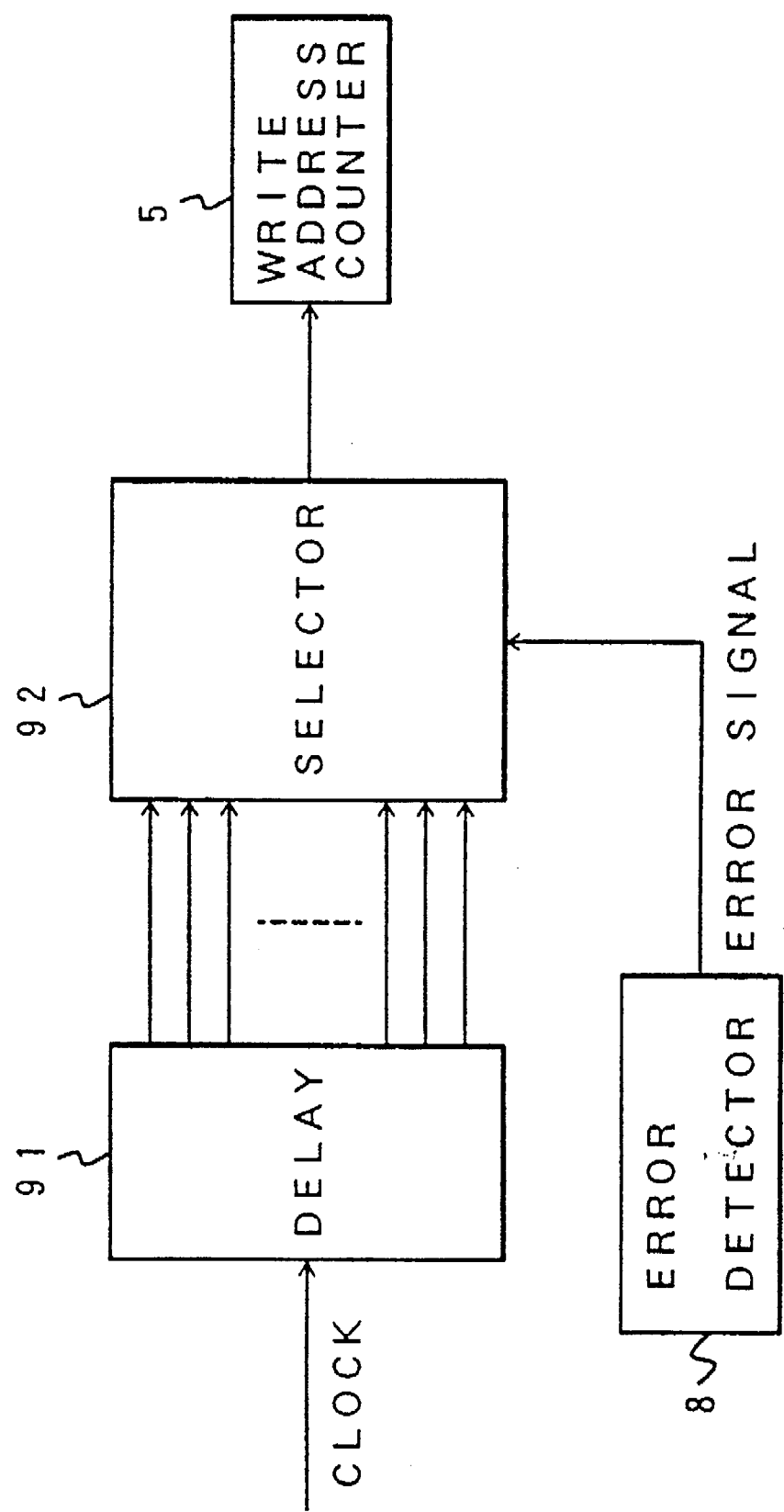
FIG. 5 shows a block diagram of an automatic horizontal position compensator in FIG. 1.

In a modification of the embodiment shown in FIG. 5, a selector position which gives zero error signal may be stored in an EEPROM(refer to numeral 64 of FIG. 6), and at an initialization, the value stored in the EEPROM may be set to the selector 92.

In an embodiment shown in FIG. 2, the test patterns 201 and 202 are composed of dots representing a vector P and dots representing a vector Q, and the two test patterns are made complementary to each other. But test patterns to be used in this invention are not limited by an embodiment shown in FIG. 2.

A check point at a same address for each pattern of a pair of test patterns is sufficient to detect the horizontal position error, and the check point may be composed in various ways, for example, by a point where dot changes its color or intensity. A pair of test patterns including such check point may be composed in various ways.

What is claimed is:

1. A horizontal position compensation circuit for compensating horizontal position on a display of a first video signal produced by computer graphics in a host computer and displayed on a raster scanned display together with a second video signal which is not produced by computer graphics, comprising:

a first frame buffer for storing said first video signal;

a second frame buffer for storing said second video signal;

a read address counter for producing an address signal to write in said second frame buffer and to read from said first frame buffer and said second frame buffer, said address signal being produced from timing pulses delivered from said host computer, said timing pulses including a clock pulse, a horizontal synchronizing pulse and a vertical synchronizing pulse;

a write address counter for producing an address signal to write in said first frame buffer;

a data selector for selecting, in an address range determined by said host computer, data read out from said second frame buffer as an output, while selecting data read out from said first buffer as said output in other address ranges; and means for adjusting the horizontal position of said first video signal and said second video signal by adjusting timing of said address signal from said write address counter based on an electronic circuit detecting alignment between a first test pattern and a second test pattern, so there is no gap between a first picture generated from said first video signal and a second picture generated from said second video signal displayed on a raster scanned display.

2. A horizontal position compensation circuit of claim 1, wherein said means for adjusting includes:

an automatic horizontal position compensator for producing delayed timing pulses having a controlled amount of delay from said timing pulses.

3. A horizontal position compensation circuit of claim 2, wherein said means for adjusting further includes:

a means for producing said first horizontal line having a first test pattern produced by computer graphics in said host computer and a second horizontal line having said second test pattern, said second horizontal line being produced through means other than said computer graphics.

4. A horizontal position compensation circuit of claim 3, wherein said means for adjusting further includes:

an error detector for detecting an interval between a first check point provided in said first test pattern and a second check point in said second test pattern.

5. A horizontal position compensation circuit of claim 4, wherein said means for adjusting further includes:

means for determining said controlled amount of delay from said interval detected by said error detector.

6. A horizontal position compensation circuit of claim 5, wherein said first test pattern comprises dots representing a first vector from a start point of a line to a point A and from a point B (B>A) to an end point of said line, and dots representing a second vector from the point A to the point B, while said second test pattern comprises dots representing said second vector from a start point of a line to the point A and from the point B to end point of said line, and dots representing said first vector from the point A to the point B, the point A or the point B being used as said check point.

7. A horizontal position compensation circuit of claim 2, wherein said automatic horizontal position compensator is provided with means for setting said controlled amount of delay to zero at an initialization.

8. A horizontal position compensation circuit of claim 2, wherein said automatic horizontal position compensator is provided with an EEPROM for storing an adaptive amount of said controlled delay and means for setting said controlled amount of delay to the contents of said EEPROM at an initialization.

9. A horizontal position compensation circuit of claim 1, wherein said first test pattern and said second test pattern are digital signals obtained at a stage of signal processing prior to said raster scanned display.

10. A horizontal position compensation circuit for compensating horizontal position on a display of a first video signal produced by computer graphics in a host computer and displayed on a raster scanned display together with a second video signal which is not produced by computer graphics, comprising:

a first frame buffer for storing said first video signal;

a second frame buffer for storing said second video signal;

a read address counter for producing an address signal to write in said second frame buffer and to read from said first frame buffer and said second frame buffer, said address signal being produced from timing pulses delivered from said host computer, said timing pulses including a clock pulse, a horizontal synchronizing pulse and a vertical synchronizing pulse;

a write address counter for producing an address signal to write in said first frame buffer;

a data selector for selecting, in an address range determined by said host computer, data read out from said second frame buffer as an output, while selecting data read out from said first buffer as said output in other address ranges; and an error detector for detecting an interval between a first check point provided in a first test pattern and a second check point provided in a second test pattern output from said data selector.

11. A horizontal position compensation circuit of claim 10, further comprising:

means for determining said controlled amount of delay from said interval detected by said error detector.

12. A horizontal position compensation circuit of claim 11, wherein said first test pattern comprises dots representing a first vector from a start point of a line to a point A and from a point B (B>A) to an end point of said line, and dots representing a second vector from the point A to the point B, while said second test pattern comprises dots representing said second vector from a start point of a line to the point A and from the point B to end point of said line, and dots representing said first vector from the point A to the point B, the point A or the point B being used as said check point.

13. A horizontal position compensation circuit of claim 11, further comprising:

an automatic horizontal position compensator for producing delayed timing pulses to said write address counter, said delay timing pulses having a controlled amount of delay from said timing pulses.

14. A horizontal position compensation circuit of claim 13, further comprising:

means for producing a first horizontal line having said first test pattern produced by computer graphics in said host computer; and means for producing a second horizontal line having said second test pattern, said second horizontal line being produced through means other than said computer graphics.

* * * * *